(12) United States Patent
Eck et al.

(10) Patent No.: US 12,190,426 B2
(45) Date of Patent: Jan. 7, 2025

(54) SYSTEMS AND METHODS FOR ANIMATED FIGURE MEDIA PROJECTION

(71) Applicant: Universal City Studios LLC, Universal City, CA (US)

(72) Inventors: Timothy J. Eck, Windermere, FL (US); Anthony Alexander Mecca, Winter Garden, FL (US); Eli Joseph Romaire, Los Angeles, CA (US); Jahaziel Minor, Cincinnati, OH (US); Matthias Wolfgang Wittmann, Santa Monica, CA (US); Alexandre Lupien, Montreal (CA); Steven Beliveau, Montreal (CA); Terry Orion Sandin, Los Angeles, CA (US)

(73) Assignee: Universal City Studios LLC, Universal City, CA (US)

( * ) Notice: Subject to any disclaimer, the term of this patent is extended or adjusted under 35 U.S.C. 154(b) by 27 days.

(21) Appl. No.: 17/842,536

(22) Filed: Jun. 16, 2022

(65) Prior Publication Data

US 2022/0405997 A1 Dec. 22, 2022

Related U.S. Application Data

(60) Provisional application No. 63/212,375, filed on Jun. 18, 2021.

(51) Int. Cl.
*G06T 13/40* (2011.01)
*B33Y 50/00* (2015.01)
(Continued)

(52) U.S. Cl.
CPC .............. *G06T 13/40* (2013.01); *G06T 17/00* (2013.01); *G06T 19/00* (2013.01); *G06T 19/006* (2013.01); *B33Y 50/00* (2014.12); *G06T 2215/16* (2013.01)

(58) Field of Classification Search
CPC .......... G06F 3/011; G06F 3/017; G06F 3/005; G06F 3/04815; G06F 3/012; B33Y 10/00;
(Continued)

(56) References Cited

U.S. PATENT DOCUMENTS 10,004,984 B2   6/2018  Voris et al.
11,127,212 B1 *  9/2021  Wilens ................. H04N 9/3179
(Continued)

OTHER PUBLICATIONS

PCT/US2022/033975 International Search Report and Written Opinion mailed Oct. 10, 2022.
(Continued)

*Primary Examiner* — Xiao M Wu
*Assistant Examiner* — Scott E Sonners
(74) *Attorney, Agent, or Firm* — Fletcher Yoder P.C.

(57) ABSTRACT

A method of dynamic media generation for presentation via projection on an animated figure includes defining, via processing circuitry, a computer-generated model of the animated figure, operating, via the processing circuitry, a manufacturing system to generate a tangible model based on the computer-generated model, generating, via the processing circuitry, a revised computer-generated model based on the tangible model, simulating, via the processing circuitry, projection of imagery onto the revised computer-generated model, and operating, via the processing circuitry, a projector to project the imagery onto the tangible model based on simulated projection of the imagery onto the revised computer-generated model.

8 Claims, 10 Drawing Sheets

(51) Int. Cl.
*G06T 17/00* (2006.01)
*G06T 19/00* (2011.01)

(58) Field of Classification Search
CPC ......... B33Y 30/00; B33Y 50/02; B33Y 80/00;
B33Y 50/00; B33Y 40/10; B33Y 40/20;
B33Y 40/00; B29C 64/393; B29C
64/386; G06T 19/006; G06T 19/20; G06T
2219/2004; G06T 17/00; G06T 15/04;
G06T 19/00; G06T 7/579; G06T 7/70;
G06T 2207/10028; G06T 7/50; G06T
13/40; G06T 7/75; G06T 7/00; G06T
2207/30201; G06T 2215/16; G06T 3/005;
G06T 11/001; G06T 11/40; G06T 15/00
See application file for complete search history.

(56) References Cited

U.S. PATENT DOCUMENTS

| | | | |
|---|---|---|---|
| 2012/0038739 A1* | 2/2012 | Welch | H04N 13/388 |
| | | | 345/426 |
| 2013/0120547 A1 | 5/2013 | Linnell | |
| 2016/0209740 A1* | 7/2016 | Grundhofer | G06T 13/80 |
| 2018/0122122 A1* | 5/2018 | Reichow | G03B 21/10 |
| 2022/0068010 A1* | 3/2022 | Cambra | G06T 19/006 |

OTHER PUBLICATIONS

Bermano et al., "Augmenting Physical Avatars using Projector-Based Illumination", ACM Transactions on Graphics, Nov. 1, 2013, vol. 32 No. 6, pp. 1-10.

* cited by examiner

SYSTEMS AND METHODS FOR ANIMATED FIGURE MEDIA PROJECTION

CROSS-REFERENCE TO RELATED APPLICATION

This application claims priority to and the benefit of U.S. Provisional Application No. 63/212,375 filed Jun. 18, 2021 (Systems and Methods for Animated Figure Media Projection), which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, animated figures (e.g., robotic characters) to entertain park guests that are queued for or within a ride experience. Certain animated figures may be brought to life by projection mapping, which traditionally directs predetermined appearances onto the animated figures. For example, a particular animated figure may be visually supplemented with a prerecorded or fixed set of images, which may align with preprogrammed movements of the animated figure. While such techniques may provide more entertainment than flat display surfaces, it is presently recognized that advancements may be made to further immerse the guests within a particular attraction, ride, or interactive experience. For example, certain animated figures have an internally-positioned projector that generates an unrealistic backlighting or glow via internal or rear projection through a semi-transparent projection surface of the animated figure. As such, it is now recognized that it is desirable to make the animated figures appear more lifelike, as well as to provide the animated figures with the ability to contextually blend with their environment in a realistic and convincing manner.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a method of dynamic media generation for presentation via projection on an animated figure includes defining, via processing circuitry, a computer-generated model of the animated figure, operating, via the processing circuitry, a manufacturing system to generate a tangible model based on the computer-generated model, generating, via the processing circuitry, a revised computer-generated model based on the tangible model, simulating, via the processing circuitry, projection of imagery onto the revised computer-generated model, and operating, via the processing circuitry, a projector to project the imagery onto the tangible model based on simulated projection of the imagery onto the revised computer-generated model.

In an embodiment, an amusement park attraction system includes a projector configured to output imagery and a control system configured to define a first computer-generated model corresponding to an animated figure, simulate projection of the imagery onto the first computer-generated model to establish first simulated projection data, transmit instructions to generate a first tangible model based on the first computer-generated model and the first simulated projection data, update the first computer-generated model to obtain a second computer-generated model based on an electronic scan of the first tangible model, simulate projection of the imagery onto the second computer-generated model to establish second simulated projection data, transmit instructions to generate a second tangible model based on the second computer-generated model and the second simulated projection data, and operate the projector to output the imagery onto the second tangible model.

In an embodiment, one or more tangible, non-transitory, computer-readable media, includes instructions that, when executed by at least one processor, cause the at least one processor to operate a manufacturing system to manufacture a tangible model of an animated figure, generate a computer-generated model of the animated figure based on an electronic scan of the tangible model, cause first movement of the computer-generated model, cause second movement of the animated figure based on the first movement of the computer-generated model, and operate a projector to output imagery onto the animated figure based on the second movement of the animated figure.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
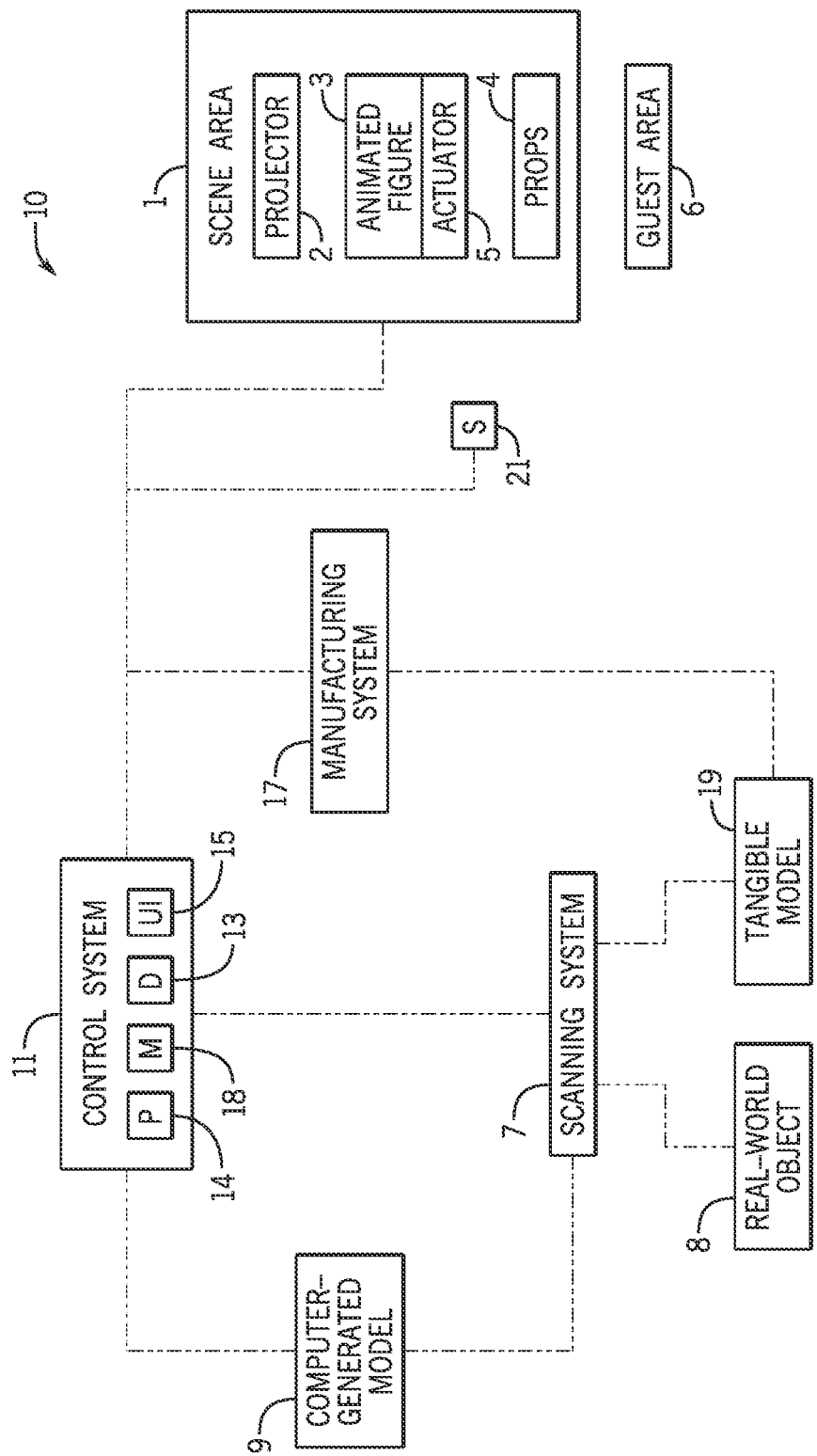
FIG. 1 is a schematic diagram of a system for providing dynamic media, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Theme parks and other such entertainment venues are becoming increasingly popular. Further, immersive experiences within such entertainment venues are in high demand. Accordingly, there is now a recognized need to improve thematic effects to provide realistic experiences that further immersive impacts on guests and allow visitors to feel they have truly been magically transported into a themed environment. It is now recognized that one of the more difficult aspects of providing such immersion includes making animated figures (which are often used for themed entertainment) appear to be more lifelike than can be achieved with traditional procedures. Non-realistic animated figures can cause a break in immersion. In particular, providing a character (e.g., human) face on an animated figure is recognized as especially difficult because visitors are attuned to very detailed aspects of facial structure and interactions, which allow subtle unrealistic aspects to be detected. Issues that have been identified with traditional techniques and that prevent willful suspension of disbelief include: insufficient illusion of life provided by three-dimensional (3D) forms (e.g., robotics) alone, actuations of synthetic skin that only represent a fraction of real facial expression, readily detectable projections based on light emission from within the animated figure, and the like. Thus, present embodiments are directed to projection media preparation, external projection onto a tangible mechanical asset (e.g., a robotic animated figure), and control aspects that coordinate layering of effects resulting from these operations to provide a realistic experience. As will be discussed below, certain aspects and procedures are performed based on centralized or distributed processor-based control along with steps involving physical transitions and operations based on automation and/or human interactions.

In view of the foregoing, present embodiments are generally directed to a method and system for creating media projections on animated figures in an amusement attraction. Specifically, present embodiments are directed to providing attraction features that facilitate immersion in a theme by providing realistic, lifelike, or otherwise immersive media projections on an external surface of an animated figure in coordination with other controlled aspects of the animated figure. Projection media, control features, audio, and aspects of the animated figure are prepared in accordance with present techniques to provide layered interactions (e.g., projected animation in coordination with fabricated 3D projection surfaces and animated figure actuations). Such layered interactions or operations provide presentations perceived by observers as extremely realistic and nuanced. Such layering is partly achieved based on utilizing a number of interactive data sources or streams (e.g., a current state of the animated figure, actions or passive qualities of guests, actions of backstage or on-stage performers) to generate detailed, complex, and subtle operations that correspond with reality. Due to the complex nature of such interactions, in some embodiments, control instructions from an artificial intelligence (AI) or machine learning engine may coordinate media, projection location, animation speed, projection surface positioning, and the like to create a realistic and immersive experience. Further, numerous and variable iteration routines are included to gradually improve aspects of the production and are repeated until an approved level of realism or immersion is achieved.

Specifically, a technique in accordance with the present disclosure provides the equipment and foundation for presenting what may be referred to herein as dynamic or active media. Dynamic media is herein defined as media layering that provides a dynamic and immersive experience for guests, in which an animated figure resembles a real person or character more closely than has traditionally been achievable. In particular, providing dynamic media described herein includes projection mapping imagery onto the external surface of the animated figure in coordination with preparing/actuating animated figure components and based on various inputs, thereby providing an animated figure that may appear more lifelike. Projection mapping may particularly be beneficial as compared to certain animated figure systems that internally project images through a semi-transparent surface of an animated figure and generate a resulting unnatural backlighting or an ethereal glowing appearance. Indeed, the dynamic media, such as the projected images and/or the movement of the animated figure, may be interactive and/or reactive, such as based on interactions with guests or detection of other parameters. Thus, instead of providing a predefined show effect, the show effect may be dynamically generated and may therefore be different, such as for different cycles of operation, to provide a more immersive experience for the guests.

As discussed herein, present embodiments and techniques define a foundation that enables provision of dynamic media using character definition, staging analysis, animation rigging, animation projection control, animated figure control, animated figure actuation, and so forth. As set forth by the present disclosure, these aspects are integrated together or layered to provide an ensemble of optical, physical, and audible interactions based on numerous inputs and controls (e.g., show control, which controls various multimedia controllers to achieve a unified automated system). This ensemble is the foundation for providing dynamic media and the associated immersive experience for viewers. For example, the result of the techniques described herein may provide a computer-generated model that more closely and precisely corresponds to a physical, tangible, real-life animated figure, and the computer-generated model may be controlled (e.g., to animate the computer-generated model) to facilitate corresponding control of the physical animated figure and enable more acute control with respect to show effects provided by the physical animated figure and imagery projected thereon.

It should be understood that while examples provided herein generally focus on mimicking a head or face of a character (e.g., a human character), present embodiments are not limited to such examples. Indeed, any manner of animated character may be portrayed in accordance with present embodiments. As an example, a feature not typically consider to be a face may be utilized and referred to herein as a face (e.g., a front of a car or a plant may have attributes enhanced or added that give the impression of a human face). Some aspects or embodiments may still be specifically directed to mimicking actual facial features, such as those of a human character, which is recognized as a difficulty in the relevant field because of familiarity and attunement of viewers to such features. Furthermore, as used herein, an animated figure may include any suitable physical object or prop that may move within a space occupied by the object. Indeed, the animated figure may include apparel (e.g., a shirt worn by a user), a deformable object (e.g., a balloon that may inflate and/or deflate), a ball that may be rolled and/or thrown, or any other suitable object that may move, and imagery projected onto the object may be dynamically adjusted based on such movement of the object. Further still, although the present disclosure is primarily discussed in the context of an amusement park, the techniques and embodiments described herein may be applied to any other suitable application, such as for a medical application, a transportation application, an architectural application, or any other application in which a computer-generated model and a corresponding physical model or figure may be utilized.

Procedures, in accordance with the present disclosure (applicable to procedures illustrated in FIGS. 2-10), for providing dynamic media include various different steps and procedural aspects. Some of these steps or procedures may be performed in parallel or in varying different orders. Some steps may be processor-based operations and may involve controlled equipment (e.g., actuators or 3D printers). Further, some procedures may be iteratively performed to achieve a desired outcome. Accordingly, while various different procedural steps may be discussed in a particular order herein, the procedural steps may not necessarily be performed in the order of introduction, as set forth by the present disclosure. While some specific steps of an operation may necessarily occur before other specific steps (e.g., as dictated by logic), the listing of certain orders of operation are primarily provided to facilitate discussion. For example, indicating that a first step or a beginning step includes a particular operation is not intended to limit the scope of the disclosure to such initial steps. Rather, it should be understood that additional steps may be performed, certain steps may be omitted, referenced steps may be performed in an alternative order or in parallel where appropriate, and so forth. However, disclosed orders of operation may be limiting when indicated as such.

FIG. 1 represents a system 10 operable to create and provide dynamic or active media, in accordance with the present disclosure. The system 10 may include a control system 11, which may include control circuitry (e.g., one or more automation controllers, one or more electronic controllers, one or more programmable controllers) configured to perform various techniques describe herein to provide the dynamic media. The control system 11 may include one or more processors or processing circuitry 14 and tangible computer-readable media 18. The tangible computer-readable media 18 may include volatile memory, such as random access memory (RAM), and/or non-volatile memory, such as read-only memory (ROM), optical drives, hard disc drives, solid-state drives, or any other suitable non-transitory computer-readable media that may store instructions thereon. The processors 14 may be configured to execute such instructions. For example, the processors 14 may include one or more application specific integrated circuits (ASICs), one or more field programmable gate arrays (FPGAs), one or more general purpose processors, or any combination thereof.

The control system 11 may be configured to operate dynamic media to provide a desirable experience, such as to present show effects, to guests. For example, the system 10 may include a scene or stage area 1 in which a projector 2, an animated FIG. 3, and other props 4 may be positioned. The control system 11 may be configured to operate the projector 2 to output content or imagery onto the animated FIG. 3 to provide a desirable (e.g., realistic) appearance of the animated FIG. 3. The control system 11 may also be configured to cause movement of the animated FIG. 3, such as via operation of an actuator 5 configured to drive the movement of the animated FIG. 3. Indeed, the control system 11 may coordinate operation between the projector 2 and the animated FIG. 3 to adjust the imagery output by the projector 2 and the movement of the animated FIG. 3 relative to one another and present a realistic appearance or effect that may not otherwise be easily achievable. The control system 11 may also be configured to operate the other props 4, such as a light emitter, an audio emitter, a fog/smoke effect system, and so forth, to complement or supplement effects provided via operation of the projector 2 and/or the animated FIG. 3. In one embodiment, the control system 11 may be communicatively coupled to a sensor 21 configured to determine various operating parameters, and the control system 11 may be configured to operate based on the operating parameters. For example, the operating parameters may include a position, orientation, and so forth of the animated FIG. 3 and/or the projector 2 in the scene area 1, audio output in the scene area 1 (e.g., by the other props 4), and/or an appearance of the imagery projected onto the animated FIG. 3.

Guests may be positioned in a guest area 6 of the system 10 and may be able to view the effects provided by the scene area 1. By way of example, the scene area 1 and the guest area 6 may be a part of an amusement park attraction system that may operate to provide a unique experience to guests. The guest area 6 may include a ride vehicle that may move (e.g., along a track or path) relative to the scene area 1, and guest passengers of the ride vehicle may view the scene area 1 while the ride vehicle passes by the scene area 1. Additionally, or alternatively, the guest area 6 may be stationary relative to the scene area 1, such as for a theatrical performance, and may include an auditorium type arrangement. In any case, operation of the scene area 1 via the control system 11 may provide dynamic media that entertains the guests in the guest area 6.

Figure 3:
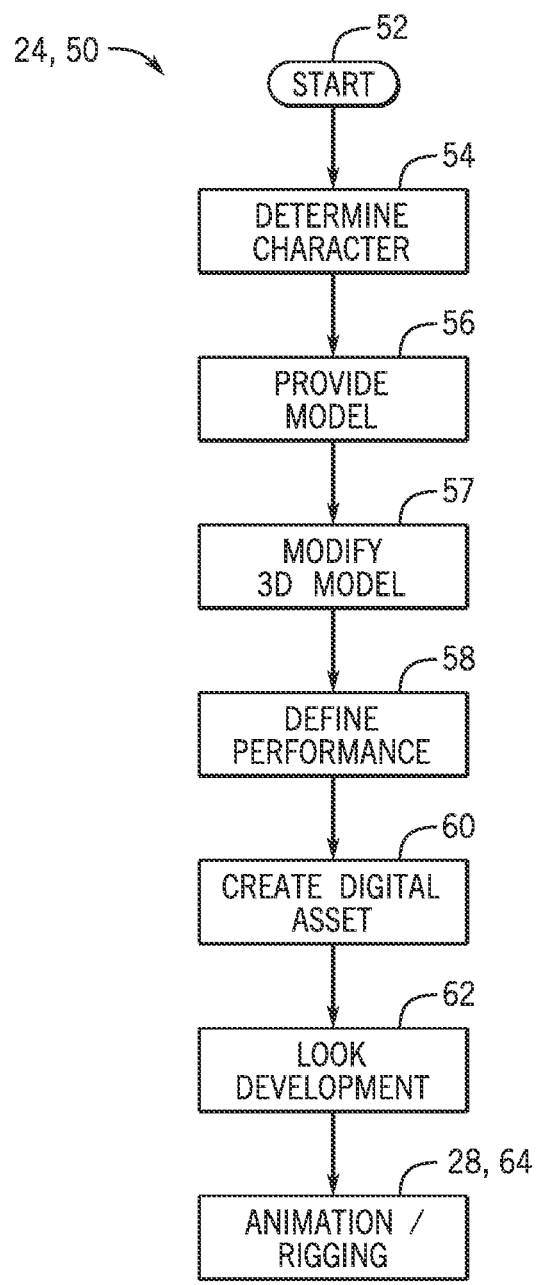
FIG. 3 is a process flow diagram that represents a process for performing a character asset step of a process operation of FIG. 2, in accordance with an aspect of the present disclosure.

The control system 11 may also be configured to iteratively perform various operations to generate desirable dynamic media, such as to facilitate creation, fabrication, operation, installation, and so forth of the projector 2, the animated FIG. 3, and/or the props 4. For example, the control system 11 may be configured to obtain a desirable character asset to generate models representing the animated FIG. 3. In an embodiment, the control system 11 may be configured to operate a scanning system 7, such as a 3D scanning device, to capture images of a real-world object 8 and create a computer-generated model 9 based on the images. The control system 11 may receive the computer-generated model 9 from the scanning system 7. The computer-generated model 9 may be used to help design and create the animated FIG. 3. For example, the control system 11 may include a display 13 that a user may utilize to view the computer-generated model 9, and the control system 11 may include a user interface (UI) 15, such as a mouse, a keyboard, a touchscreen, a trackpad, a dial, a button, and so forth, that the user may utilize to adjust various features of the computer-generated model 9.

The control system 11 may also be configured to operate a manufacturing system 17, such as a 3D printing machine and/or a molding machine (e.g., injection molding machine), to create a tangible model 19. The tangible model 19 may be a more simplified version of (e.g., a portion of, a miniaturized model of) the animated FIG. 3 for initial evaluation and/or testing purposes. As an example, an initial determination may be made regarding whether imagery output onto the tangible model 19 (e.g., via the projector 2) appear to be desirable prior to commencing a more complicated design and/or manufacturing process of the animated FIG. 3. In an embodiment, the computer-generated model 9 may be adjusted based on the appearance of the tangible model 19 (e.g., the imagery projected onto the tangible model 19). For instance, the control system 11 may operate the scanning system 7 to create a computer-generated model 9 based on the tangible model 19 (e.g., images captured of the tangible model 19). Thus, the computer-generated model 9 may be updated to more closely represent the tangible model 19 instead of the real-world object 8. Such a computer-generated model 9 may also be adjusted via the control system 11 and subsequently used to create a subsequent tangible model 19 via the manufacturing system 17.

In this manner, numerous iterations of computer-generated models 9 and/or tangible models 19 may be created until a desirable appearance representative of the animated FIG. 3 with imagery projected thereon is produced. When a satisfactory appearance (e.g., of the tangible model 19) has been achieved, the control system 11 may facilitate fabrication of the animated FIG. 3. For example, the control system 11 may finalize the computer-generated model 9, such as by creating a design that is more suitable for mechanical manufacturing purposes. The final product of the animated FIG. 3 may then be fabricated based on the finalized computer-generated model 9 and prepared for installation within the scene area 1. Operation of the animated FIG. 3, such as movements as instructed by the actuator 5, may be based on the computer-generated model 9 (e.g., movement simulated via the computer-generated model 9).

Figure 2:
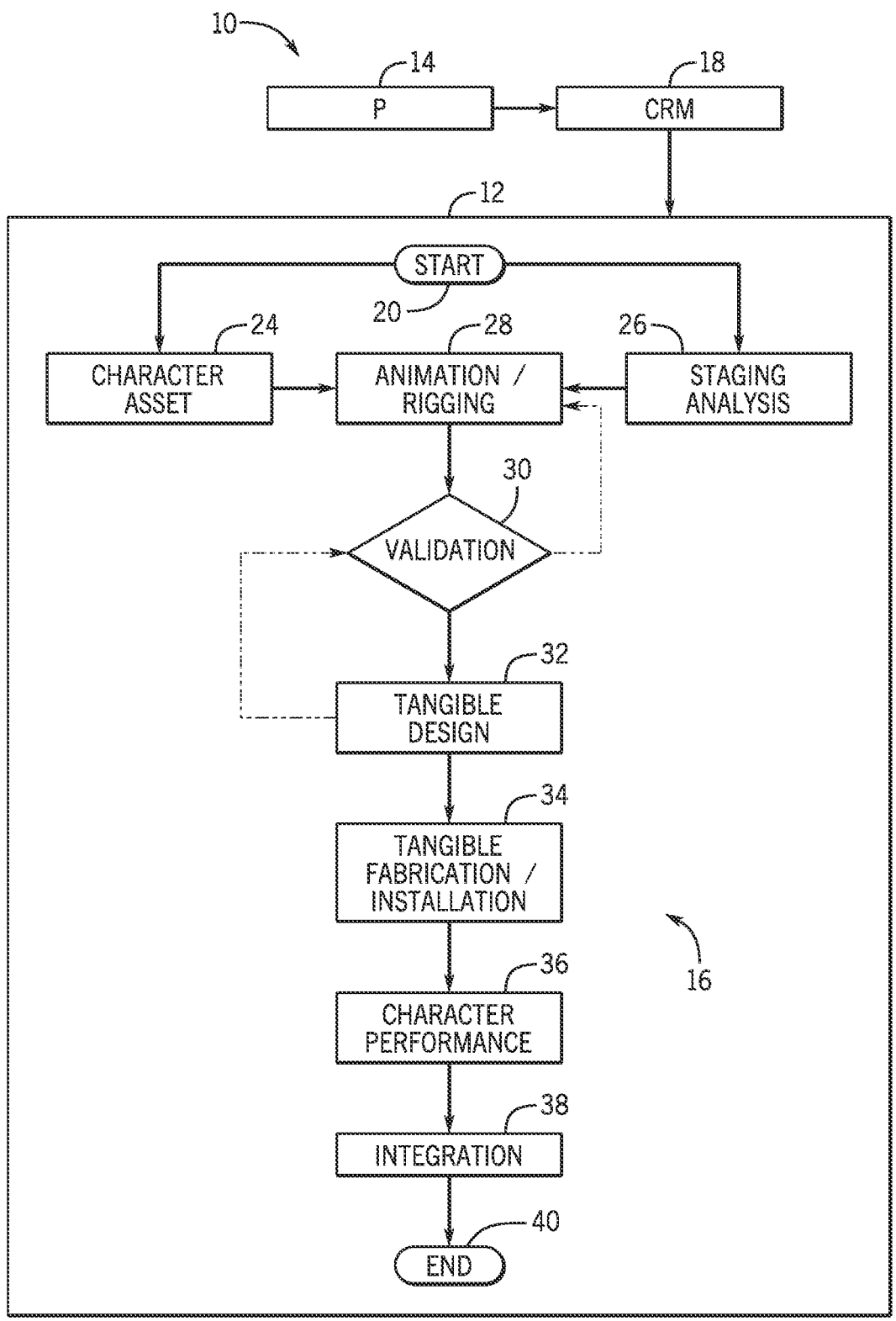
FIG. 2 is a block diagram of a system and corresponding system operations for providing dynamic media, in accordance with an aspect of the present disclosure.

FIG. 2 represents the system 10 operable to perform a process 12 for providing dynamic media, in accordance with the present disclosure. This process 12 may be representative of various computer operations performed via the processors 14 based on instructions 16 stored on the tangible computer-readable media 18, including operations using AI and machine learning. Some operations may not be directly controlled by a processor (e.g., certain physical operations). However, even certain physical operations, such as manufacturing (e.g., via 3D printing) may involve control aspects. Each of the steps of the process 12 will be discussed in further detail below.

A start of the process 12 is represented by start block 20, which indicates initiation of a character asset step 24, which may provide a character or element on which projection media may be based, and a staging analysis step 26, which may provide a scene, venue, narrative, environment, setting, and/or function in which an animated figure may be implemented. The character asset step 24 and the staging analysis step 26 may be performed in parallel or series. Results from these steps are then utilized in an animation/rigging step 28, which may create a computer-generated model representative of an animated figure onto which media may be projected. Following the animation/rigging step 28, a validation step 30 is performed to finalize the computer-generated model of the animated figure, and a tangible design step 32 may then be performed to prepare for fabrication of the animated figure, such as to provide a mechanical digital asset, based on the finalized computer-generated model. The animation/rigging step 28, the validation step 30, and the tangible design step 32 include iterative aspects to refine results to a desired level of audience perceived authenticity. Once the tangible design operation 32 is designated as complete, a tangible fabrication/installation step 34 is performed to create the animated figure and/or a stage or environment in which the animated figure may be implemented to provide the dynamic media. A character performance step 36 to determine movement of the animated figure and/or projection of imagery on the animated figure may then be performed to coordinate movement of the animated figure and operation of dynamic media, followed by an integration step 38 to install the dynamic media in a scene area and finalize operation of the dynamic media. Once the integration step 38 is complete, the overall process 12 may be considered at an end, as designated by end block 40, with finalized dynamic media generated and created as a product of the process 12. The resulting dynamic media may then be operated and presented to a guest, such as in an attraction system of an amusement park system. For example, completion of the integration step 38 may provide a computer-generated model and a physical animated figure closely corresponding to the computer-generated model. Operation of the dynamic media may include using the computer-generated model to simulate movement of the computer-generated model and/or imagery projected onto the computer-generated model and providing corresponding movement of the physical animated figure and/or imagery projected onto the physical animated figure. Details associated with individual aspects of the overall process 12 will be discussed in further detail below.

FIG. 3 is a process flow diagram that represents a process 50 for performing the character asset step 24 of the process 12, in accordance with the present disclosure. The character asset step 24, which may also be referred to as character asset creation, includes development or selection of a character asset, which results in provision of projection media for displaying a projection of a character or aspects of a character (e.g., projection media for presenting human face animations) as a component of providing dynamic media. The process 50 is initiated, as indicated by start block 52, and proceeds first to determining a character, as represented by block 54. Determining the character may include selecting a particular subject (e.g., a person, sculpted image, animal). Upon selecting a character, a model or form (e.g., a 3D digital human face model) of the character may be created, as represented by block 56. The form or model (e.g., 3D model) may be referred to as a computer-generated model. For example, a predefined or predetermined model (e.g., 3D model) or computer-generated model may exist for a selected subject, and the predefined model may be selected and retrieved from storage. Additionally, or alternatively, a new computer-generated model may be defined for a character, such as for a subject that does not have an associated model and/or for a subject that may have an outdated model. For instance, the 3D scanning technique employs 3D scanning technology for creating 3D computer-generated models (typically with very high precision data capture) of real-world objects, such as a sculpture, object, or living being. Specifically, a 3D scanner captures numerous images of an object and generates an electronic scan (e.g., electronic mapping of the object). The captured images are then fused, stitched, combined, or otherwise integrated into a 3D computer-generated model, which is an electronic 3D replica of the subject or object and may include various points or portions of the subject mapped to a 3D coordinate system. Once the computer-generated model is defined (e.g., via scanning), an associated viewing and/or editing software application may enable viewing and/or manipulation of the computer-generated model on a display (e.g., a computer screen) from various different angles. For example, the software application may facilitate virtually rotating the computer-generated model on the display (e.g., using a user interface, such as a mouse or keyboard).

In some embodiments, the computer-generated model may be graphically modified, as represented by block 57. For example, a color, a texture, a feature (e.g., facial feature, hair, jewelry or accessory) of the computer-generated model may be added, removed, or otherwise adjusted. A model ratio or sizing of the computer-generated model may also be modified. In this manner, the computer-generated model may facilitate greater customization of an appearance of a selected character to achieve a desirable depiction, such as based on the implementation of projected media.

As illustrated in FIG. 3, the process 50 proceeds to define character performance, as represented in block 58. Defining character performance may be performed before, after, or in parallel with creation of a computer-generated model (block 56) and/or modification of a computer-generated model (block 57). The step indicated by block 58 may include capturing real life video imagery and other motion data of an actor's character performance (e.g., movements used by a subject while acting out a scene), including associated facial feature movements. Motion capture technology may be used to capture such video imagery and motion data. The data associated with this captured video may then be employed with the computer-generated model to define the character performance. Specifically, motion capture technology and data point associations may be used to define the character performance. For example, a motion capture point on an actor's lip may be identified for later use with a corresponding point (e.g., coordinate point) on a representation of the lip in the computer-generated model (e.g., electronic facial model), and associated movement data of the motion capture may be applied to the lip in the computer-generated model. In other words, the movement of the computer-generated model (e.g., within the 3D coordinate system) may be determined based on corresponding motion capture of the subject of which the computer-generated model represents. As another example, 3D animation techniques may be employed to define the character performance. Specifically, for example, a software application may be employed to edit and manipulate a base image and/or the computer-generated model to create a series of images that coordinate to provide animation. Thus, further manipulation of the computer-generated model may define information representative of movement of the character. Numerous traditional animation techniques may be employed in accordance with this aspect of present embodiments. The defined animation or movement of the character (e.g., a position of the character over time) may be stored as animation data, which may be readily retrieved for implementation and/or additional modification. Further, audio may be recorded as part of (e.g., in parallel with video capture) or separately from the visual portion of the character performance. The audio may be joined with video data to provide a completed character performance. However, in some situations, video data may be generated and/or employed without audio data.

Using acquired data, the process 50 may create or establish a digital asset (e.g., a static facial model), as represented by block 60, that may be stored, retrieved, and/or further manipulated, such as to perform different motion and/or provide different appearances. Data related to captured imagery, movements, location point arrangements or configurations (e.g., facial expressions), and the like may be utilized to define the digital asset (e.g., digital facial asset) that may represent an appearance of a character at a particular point in time. This step may include employing a structural construction algorithm (e.g., a facial construction algorithm) that utilizes available data to predict and fit aspects of a certain type of structure (e.g., facial structure) to facilitate depiction of a wide range of movement-based operations (e.g., facial expressions) for the character. Indeed, this procedure may enable generation and simulation of various instances of expressions without requiring specific capture of such movements in an earlier step. Further, a step of look development, as represented by block 62, may be performed on this digital asset to prepare the associated graphics for use with a game engine, which may include a set of software tools or application programming interfaces that facilitate building graphic-based models of a subject or character. Specifically, using traditional techniques, this may include texturing, surfacing, and assembling geometric instances that facilitate animation that is realistic or otherwise immersive for use in providing dynamic media. At this point, the illustrated process 50 may be considered at an end. However, as will be discussed below, the digital facial asset (e.g., after completion of look development) will later be used with animation and/or rigging (as represented in FIG. 1 by block 28 and in FIG. 3 by block 64) to provide a completed computer graphic asset.

Figure 4:
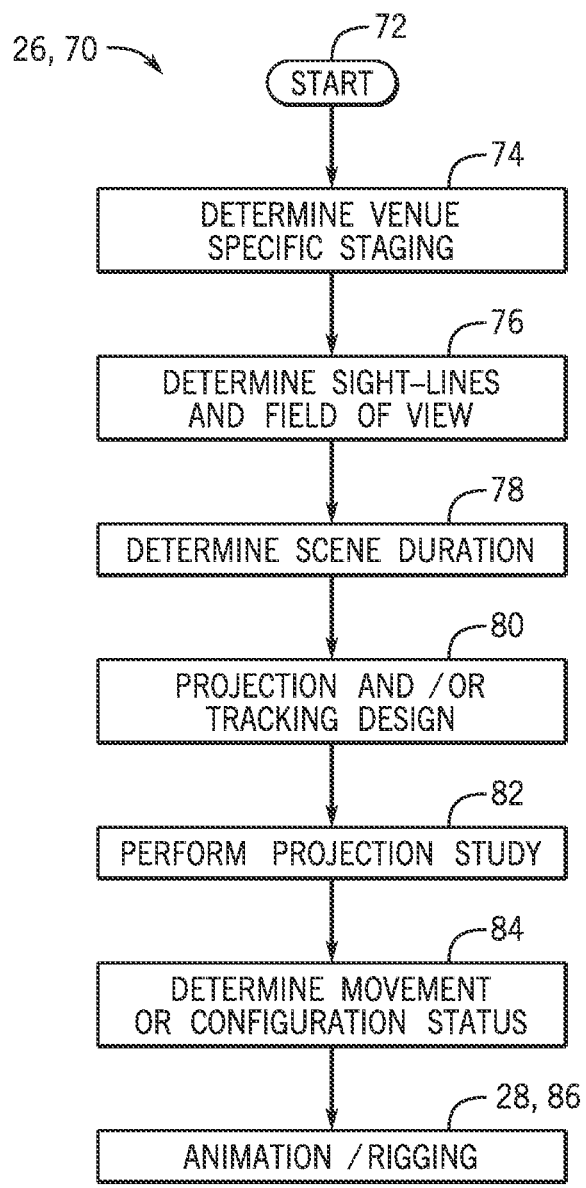
FIG. 4 is a process flow diagram that represents a process for performing a staging analysis step of a process operation of FIG. 2, in accordance with an aspect of the present disclosure.

FIG. 4 is a process flow diagram that represents a process 70 for performing the staging analysis step 26 of the process 12, in accordance with the present disclosure. Data acquired from the process 70 may be employed to facilitate layering of effects to provide dynamic media. For example, timing, position, and orientation data acquired during the process 70 may be utilized to control media display, model operation, and animated character actuation (e.g., robotic actuation) in concert, in accordance with present embodiments. Initiation of the process 70 is represented by start block 72 and, as previously noted, the process 70 may be performed before, after, or in parallel with the character asset step 24.

As an initial step in the process 70 of FIG. 4, scene or venue-specific staging of the character is determined 74 to determine implementation of the character in a scene area that may include other show effects, props, or elements in addition to the character. Scene-specific staging may be performed using computer modeling (including a computer-generated model of the scene area and the animated figure), which may include mapping specific coordinates (including volumetric aspects) of a character in various different poses or orientations within a 3D coordinate system of a scene area at different points in time. Further, sight-lines and field of view may be determined or calculated with respect to one or more guest perspectives, as represented by block 76. Determining sight-lines and field of view may include determining (e.g., via the computer-generated model) a mean or average perspective for numerous different potential audience viewing positions, such as based on a positioning of the guests and/or guest area with respect to the real-world scene area. For example, the movement or placement of the character in the scene area may be established based on the sight-lines and field of view to enable visibility of target portions of the character to the guests. Further, a scene duration (e.g., an amount of time allotted or typically used for performance of a particular scene or presentation) is determined, as represented by block 78. Determining a scene duration may include timeframe determinations for aspects or portions of a scene, such as a total duration of operating a single cycle of the scene, time stamps at which the scene initiates and/or terminates, and the like. Determining the scene duration may additionally, or alternatively, include determinations associated with the character in the scene, such as a respective duration of time associated with maintaining various positionings of the character and therefore maintaining resulting visibility of different portions of the character, a timeframe for performing a movement via the character (e.g., transitioning between facial expressions), a time stamp indicative of movement of the character with respect to movement of other elements of the scene (e.g., the character moves in conjunction with movement of an additional prop), and so forth.

The process may also include initial projection and tracking/camera design, as represented by block 80, which may include virtual placement or physical placement of related devices, such as projectors and/or devices (e.g., bogeys) that may move the projectors. The initial projection and/or tracking design may simulate an appearance (e.g., from the guests' perspective) of imagery output via a projector onto the character from a particular positioning (e.g., location, orientation) of the projector. Further, the process may include a projection study, as represented by block 82, which may include a formal study based on a projection cone/frustum, angle, field of view, guest sight-lines, and so forth. The projection study may be performed via software to help determine whether projected imagery may appear to be distorted, interfered with (e.g., occluded or blocked by another prop), or otherwise undesirably output onto the character by the projector. Thus, the projection study may be used to determine whether the image data used to output the imagery is to be adjusted, the positioning of the projector is to be changed, a different projector or type of projector is to be used, an additional projector is to be incorporated, and the like.

Accommodations for projection adjustments based on character movement and configuration transitions may be provided by detecting certain character configuration statuses (e.g., geometries, profiles) in block 84. For example, for a character with a dynamic or active mouth (e.g., a character physically operable to transition a mouth feature between open and closed configurations), an open-mouth configuration (e.g., a configuration in which jaws of the character are open) and/or a closed-mouth configuration (e.g., a configuration in which jaws of the characters are closed) may be determined. In other embodiments, different configurations (e.g., a raised or lowered forehead configuration) may be determined. Further, larger or more substantial transitions (e.g., a ball morphing into a star shape or spiked ball) may also be accommodated. Again, such data may be employed to facilitate layering of effects to create realistic imagery by associating different projected imagery, types of projected imagery (e.g., imagery projected by a certain projector or from a certain directionality), or categories of projected imagery (e.g., a happy expression for an open-mouth configuration as compared to a happy expression for a closed-mouth configuration) with different possible configurations of the character. For example, an open-mouth configuration of a physical character head may be associated with a projection that aligns with the expanded shape of the character head (e.g., relative to a closed-mouth configuration) to create a more realistic and immersive experience for viewing. Indeed, results provided by present embodiments are believed to be superior to traditional presentations in part due to such layering of effects and the subtle details associated with such layering. As with the process 50 represented in FIG. 3, data generated in the process 70 may now be utilized with animation and/or rigging (as represented in FIG. 1 by block 28 and in FIG. 4 by block 86) to provide a completed computer graphic asset.

Figure 5:
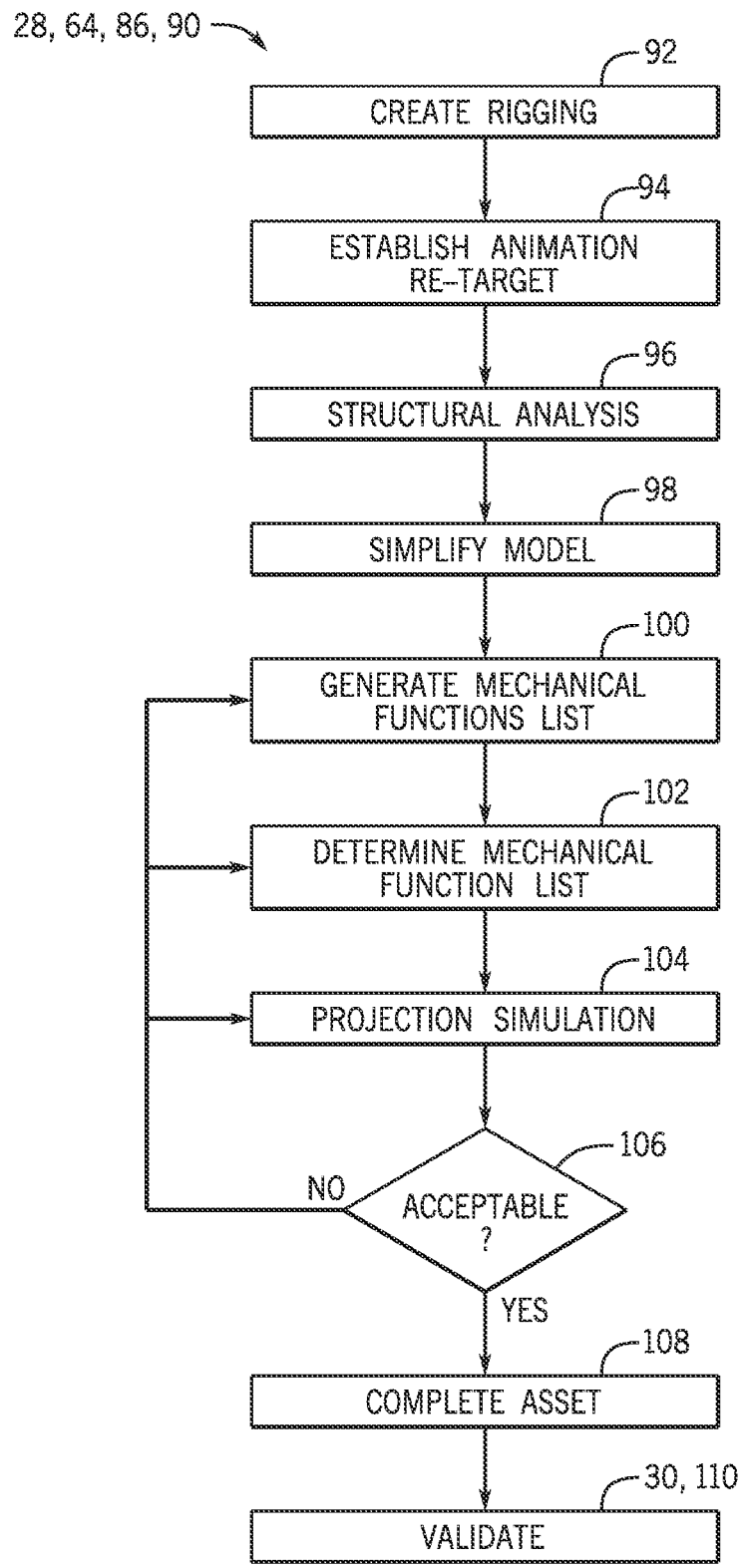
FIG. 5 is a process flow diagram that represents a process for performing an animation/rigging step of a process operation of FIG. 2, in accordance with an aspect of the present disclosure.

FIG. 5 is a process flow diagram that represents a process 90 for performing the animation/rigging step 28 of the process 12, in accordance with the present disclosure. In accordance with the present disclosure, the animation/rigging step includes a skeletal animation technique (e.g., via a computer modeling program) for representing a 3D character model (e.g., the computer-generated model created at block 54 of the process 50) using a series of virtually interconnected digital structural features, which may be referred to as digital bones. Specifically, animation/rigging (or simply "rigging") may be utilized in the present disclosure to refer to process steps of creating the digital bone structure of a 3D character model to define interlinking aspects and movement associations of different parts of the 3D character model. This digital bone structure may be employed, in accordance with present embodiments, to manipulate the 3D character model like a puppet for animation purposes. Such animations may include manipulation of a facial model and contortion of the facial model to cause different facial expressions.

The process 90 may begin with block 92, which may include generation of a preliminary rigging from the character asset (e.g., a digital facial asset created at block 60) assembled in the process 50. That is, an initial digital bone structure of the character asset may be created to define initial sets of interlinking aspects of the character asset. However, in some circumstances, the initial digital bone structure may be more complex, intricate, or excessive than desirable for the specific movement and/or projection mapping purposes related to implementation of the character. As illustrated in FIG. 5, a next step represented by block 94 may include establishing an animation re-target (e.g., a rough animation), which may include applying a captured performance (e.g., character performance defined at block 58 of the process 50, such as character performance captured in video) to a look development (e.g., the look development completed at block 62 of the process 50). In this manner, the animation data created and stored as a result of block 58 may be modified (e.g., iteratively modified) based on the look development and other performed steps to enable the animation data to cause simulated movement of the digital bone structure. The process 90 further includes structural analysis (e.g., facial analysis) based on positioning of structural features (e.g., eyebrows, temples, cheeks, mouth, jaw, lips) in major orientations or positionings (e.g., facial expressions), as represented by block 96. Using data from this analysis, digital bones and digital joints (e.g., linkages between digital bones) may be determined for the major orientations (e.g., major facial expressions). That is, the particular subset of digital bones and digital joints that may be actuated or otherwise moved via the animation data to form different major orientations, such as to transition the 3D character model between the different expressions of a corresponding static facial model, for the scene are determined.

Next, the 3D character model (e.g., a computer-generated model of a human face) is simplified (e.g., using a simplification algorithm) to make the 3D character model more amorphous in form while maintaining major structure, as represented in block 98. That is, certain digital bones and/or digital joints that may not be used to achieve different major orientations for a scene may be removed to reduce a quantity of the sets of interlinking aspects of the character asset. For example, a facial model may be simplified (e.g., certain interlinking facial structure, such as between an ear and a jawbone, may be removed or disassociated from one another) and made more amorphous based on an algorithm designed to generate such a simplification specifically for certain facial expressions. The simplification of the 3D character model may be performed manually (e.g., a user may manually select which digital bones and/or digital joints are to be removed or kept) and/or automatically (e.g., based on automatic detection that usage of certain digital bones and/or digital joints is below a threshold value to provide the major orientations). The remaining locations and associations between digital bones and digital joints facilitate identification and maintenance of major facial structure in such an algorithm to achieve the major orientations.

Once the simplified 3D character model has been generated in block 98, the process 90 may proceed to an iterative portion of the process 90. This may include creating a computer graphics rig and mechanical function list for specific actuation (e.g., facial functions), as represented by block 100. That is, a list of different resulting outputs, such as movement of the 3D character model and/or resulting appearance (e.g., facial expression) of the 3D character model, associated with actuating or moving different remaining digital bones and/or digital joints of the 3D character model (e.g., the simplified 3D character model) may be determined, such as to achieve movement of the 3D character model associated with animation data created at block 58. Thus, the initially generated mechanical function list may include a wide variety of different outputs, such as more orientations than the major orientations desirable for implementation. Additionally, the iterative portion may include selecting, adjusting, modifying, or identifying the mechanical function list, as represented by block 102. For example, the particular actuation of the digital bones and/or digital joints of the 3D character model used to achieve the major orientations via the animation data may be determined. As such, the initially generated mechanical functions list may be simplified to reduce a quantity of mechanical functions included in the mechanical functions list to focus on that desirable for providing the major orientations. In an embodiment, the animation data associated with movement of the 3D character model may be updated based on the mechanical function list, such as to provide updated movement that may be more compatible or achievable via the digital bone structure (e.g., the digital bones, the digital joints) in view of the mechanical function list.

Further, as represented by block 104, the iterative process may include projection simulation (via a processor-based computer simulator or other software, such as computer graphics compositing and visual effects software) of computer-generated imagery, which may take into account previously determined data, including look development of the character, sight-lines of the guests, movement and/or major orientations of the 3D character model, and so forth. The projection simulation may generate image data representative of virtual content or imagery that, when projected onto the 3D character model, provides a realistic depiction of an appearance of a projection onto a physical real-world object representative of the 3D character model. As an example, for projection simulation performed by a processor-controlled simulator (e.g., a simulation package or application operated on a computer) and/or computer graphics compositing and visual effects software, a 3D character model (e.g., a 3D character model of a face) may be positioned (e.g., rotated) with respect to a virtual projector, and simulated lens qualities for the virtual projector may be virtually selected to match those of an actual projector. The simulation may then render the projection surface (e.g., structure and texture) with respect to the virtual projector and output the resulting image. If the projection surface and virtual projector sufficiently correspond to real-world counterparts, the result may more precisely portray an appearance of the projected content in the real-world.

Continued iteration of these procedures depends on an outcome from decision block 106, which includes a determination as to whether computer-generated imagery output from the process 90 at this point is deemed acceptable (e.g., based on a user input or computer-implemented criteria based on an algorithm). If the output is not acceptable (e.g., the major orientation caused by certain actuation of the digital bones and/or digital joints of the 3D character model is undesirable, the appearance of the imagery projected onto the 3D character model is undesirable, coordination between movement of the 3D character model and adjusted imagery projected by a virtual projector is undesirable), iteration may begin again at any one of blocks 100, 102, and/or 104. Selection of the appropriate procedural step for continued iteration may be dependent on data associated with the outputted computer-generated imagery at the relevant time. For example, a determination may be made regarding whether the actuation of the digital bones and/or digital joints of the 3D character model based on the mechanical function list is to be adjusted, whether the imagery output by the virtual projector is to be adjusted (e.g., by adjusting the image data used to cause the virtual projector to output the imagery), or both based on the appearance and/or quality of the 3D character model with the imagery projected thereon. The assessment of the 3D character model and the projected imagery may be based on an algorithm, artificial intelligence, user input, and/or the like. Once the output computer-generated imagery is deemed sufficient at block 106, a completed computer-generated asset that may include the computer-generated 3D character model, the associated projected imagery, and/or updated animation data is defined, as represented by block 108. At this point, a transition is made to a validation process, as indicated in FIG. 5 by block 110.

Figure 6:
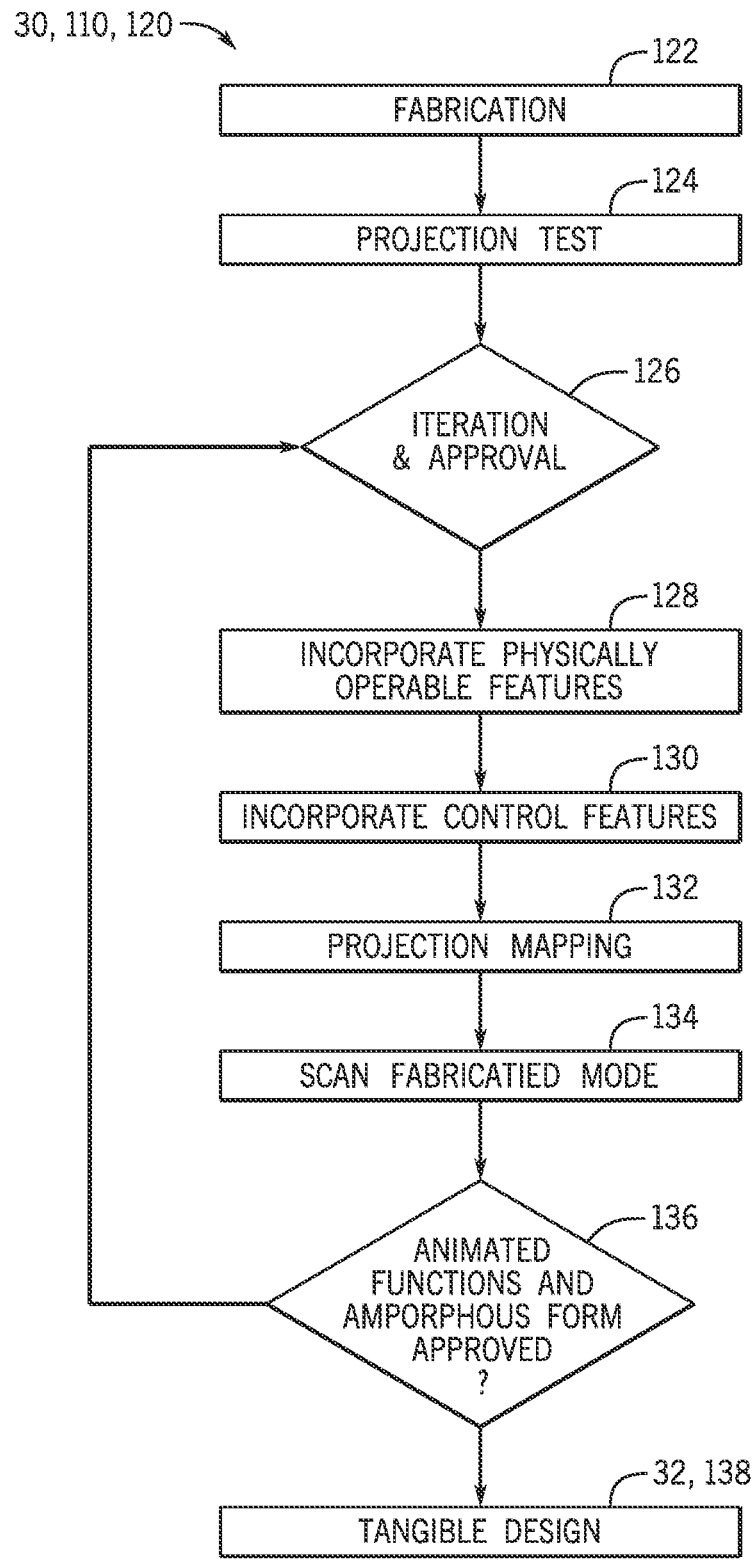
FIG. 6 is a process flow diagram that represents a process for performing a validation step of a process operation of FIG. 2, in accordance with an aspect of the present disclosure.

FIG. 6 is a process flow diagram that represents a process 120 for performing the validation step 30 of the process 12, in accordance with the present disclosure. The process 120 for validation may be initiated with fabrication of a tangible or physical version of the computer-generated model (e.g., 3D printing of a character head or face), as represented by block 122. This may include automated 3D printing, additive manufacturing, molding (e.g., injection molding), or component production (e.g., form cutting) based on instructions from a controller after confirmation of sufficiently composed computer-generated imagery. Fabrication of the tangible model may include improvement operations to facilitate use of the fabricated model for projection testing. For example, improvement operations may include sanding, polishing, texturing, painting, trimming, punching, cutting, and the like. Next, projection testing may be performed using multiple static poses of animation on the fabricated model, as represented by block 124. For example, projection testing may include projecting imagery of different facial expressions onto a manufactured facial structure model. To this end, image data used to simulate imagery projection onto a computer-generated model, such as at block 104 of the process 90, and/or image data adjusted based on simulated projection onto the computer-generated model may be transmitted to a projector to output imagery onto the tangible model based on the image data. In an embodiment, various portions of the tangible model (e.g., puppet rig) may be movable relative to one another to enable at least partial achievement of the major orientations for the character represented by the tangible model. However, it should be noted that the tangible model created during the validation step 30 may be a more simplified design (e.g., having a limited range of motion) with respect to a finalized, tangible animated figure to be provided and implemented in dynamic media.

Next, various iterative operations may be performed, as indicated by iteration and approval block 126. As indicated in FIG. 6, various steps may be included as iterative operations. Specifically, in one step, physically or manually operable features may be incorporated, as represented by block 128. For example, block 128 may represent addition of flexible skin to a fabricated head with actuators (e.g., hand operable levers) for providing facial movement. In other embodiments, other features of an animated figure may be updated with corresponding flexible skin (e.g., fur, scales, sheathing) and associated actuators. Another iterative step, as represented by block 130, may include incorporation of servo-motors and a controller for automatically synchronizing motion of relevant actuations. For example, actuators associated with facial features may be automatically operated (e.g., without a user manually operating each individual actuator) in various synched movements to display an array of facial expressions on a fabricated head and face with flexible skin. It should be noted that the steps of block 128 and 130 may be mixed, excluded, or kept separate in accordance with aspects of the present disclosure.

Yet another iterative step may include block 132, which represents projection on the tangible model assembled in blocks 128 and/or 130 to establish a correspondence between mechanical features of the tangible model and projection characteristics (e.g., alignment of eye movement with mechanical positioning of tangible eye features). At this point, an iterative step, as represented by block 134, may include scanning the tangible model (e.g., using LiDAR (light detection and ranging) or other 3D scanner) to establish an updated computer-generated model (e.g., an electronic scan or mapping) based on the tangible model. Previous procedures, such as generating the bone structure, determining a mechanical function list, and/or simulating projected imagery, may be performed using such an updated or new computer-generated model. By way of example, movement, positioning, and/or geometry of the tangible model may be obtained, such as via motion capture of the tangible model, and such movement, positioning, and/or geometry may be used to update the animation data used for controlling the computer-generated model. In this manner, certain steps of previously-described processes, such as the process 90 that were previously performed for an initially created computer-generated model may be performed for the updated computer-generated model that is based on the tangible model. Such an operation to initially provide and utilize a more simplified tangible model can improve efficiency of iterations and facilitate transition from an initially created computer-generated model (e.g., via block 56 of the process 50) to a working physical structure, such as without having to create multiple designs and fabrications of a more complex and finalized animated figure.

Further, as illustrated in FIG. 6, using data from previous steps in the iteration, a determination can be made as to whether to further iterate to provide an updated computer-generated model, such as by iteratively updating and fabricating subsequent tangible models and/or adjusting the image data used to project imagery onto the tangible model, or to finalize the computer-generated model. Specifically, as represented by block 136, a determination is made as to whether animated functions of the projection onto the form of the tangible model is approved. If approved, the process 120 transitions to a tangible design phase, as represented by block 138. Again, it should be noted that the steps set forth in FIG. 6 are not necessarily performed in the indicated order. Further, certain steps may be combined or skipped altogether, in accordance with aspects of the present disclosure.

Figure 7:
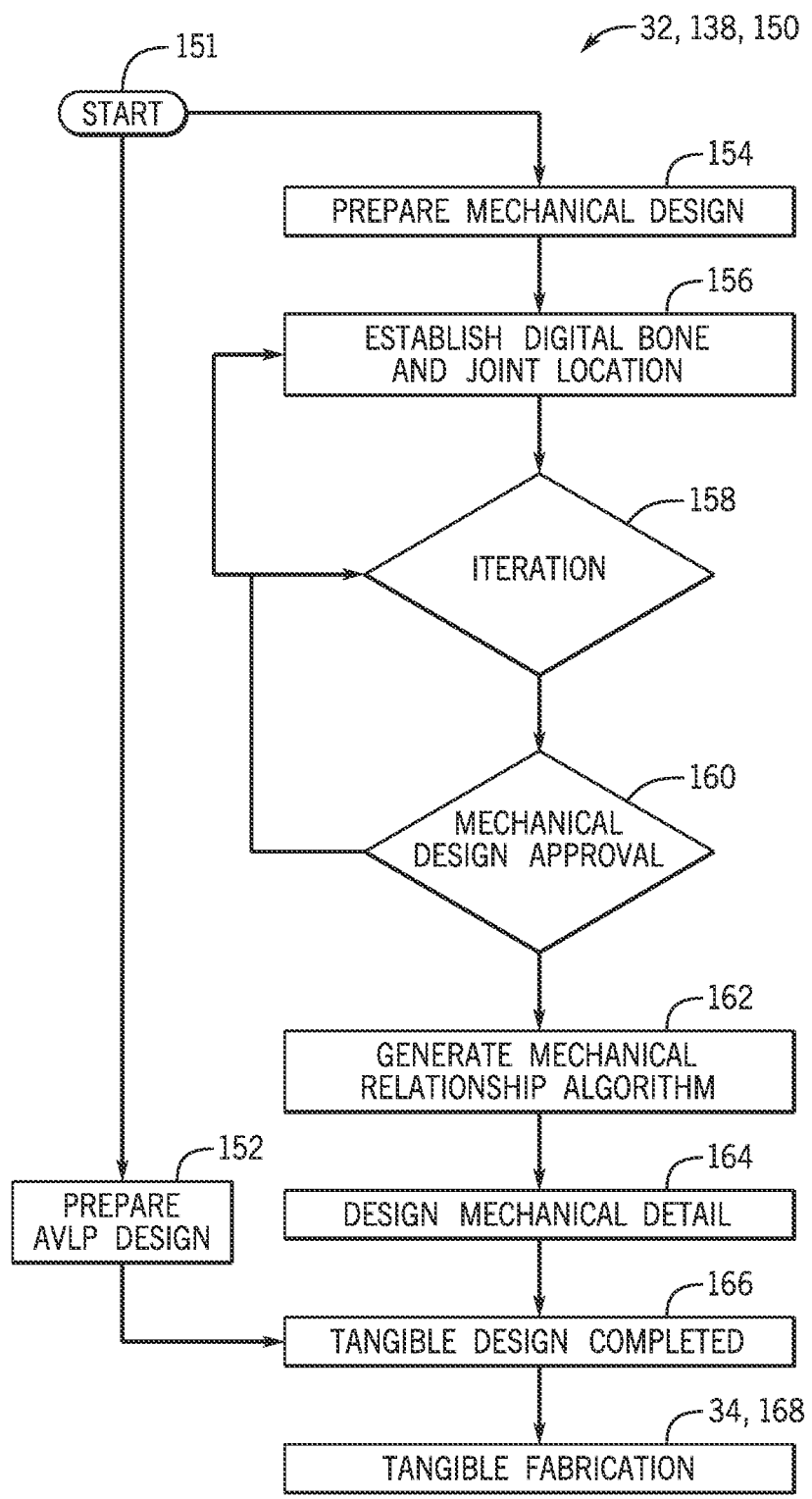
FIG. 7 is a process flow diagram that represents a process for performing a tangible design step of a process operation of FIG. 2, in accordance with an aspect of the present disclosure.

FIG. 7 is a process flow diagram that represents a process 150 for performing the tangible design step 32 of the process 12, in accordance with the present disclosure. In the illustrated embodiment of the process 150, which begins at start block 151, a converging parallel approach is depicted. In a first branch of the process 150, a detailed audio, video, lighting, and projection (AVLP) design is prepared, as represented by block 152. This step may include preparation of artistic media, effects, and presentations incorporating audio, video, lighting, and projection technologies. In a second branch, mechanical designs may be commenced, as represented by block 154. This step may include mechanical simulation (e.g., 3D modeling) of mechanics, determination of a geometry of a shell or base that establishes the primary structure (e.g., head skeletal enclosure) of the animated figure, determination of a texture and/or structure of skin accessory attached to (e.g., covering) the shell, and the like based on previously acquired data points, such as the updated computer-generated model. Further, using the foundations established in block 154, physical locations for joints and structures (e.g., corresponding to digital bones and joints of the updated computer-generated model) may be established, as represented by block 156, such as based on the steps performed at blocks 96, 98 of the process 90. The operations performed in block 156 may also include simulated placement of real-world actuators in the updated computer-generated model (e.g., within the shell) to move the joints and/or structures based on corresponding actuator ranges of motion and determination of associated displacement of aspects of the updated computer-generated model (e.g., movement of structure, shell, and/or skin) based on operation of the real-world actuators to simulate movement of an animated figure. The simulated actuators in the computer-generated model may be operated based on the animation data created and modified above, for example, to provide movement of the joints and structures of the computer-generated model.

As with other aspects of the disclosed techniques, these steps may be subject to iteration, as represented by block 158, such as to update the selected mechanical function based on achievable joints and structures via real-world actuators and/or to update the projection simulation based on placement of the real-world actuators. For example, a mechanical digital asset established by the operations represented by block 154 and 156 may be utilized in the process 90 of FIG. 5 (e.g., to indicate arrangement of components, such as the shell, the real-world actuators, the skin, incorporated in the animated figure) to update the computer-generated asset completed in block 108. Iterations may continue until mechanical design approval is approved, as represented by block 160.

Once the mechanical design is approved (block 160), the process 150 proceeds to generation of an actuator and rigging relationship algorithm (e.g., a model of joint and actuator position and operation design), as represented by block 162, and then detailed mechanical design, as represented by block 164. Specifically, the generated algorithm and detailed mechanical design may include planning for assembling, positioning, and/or operating the shell, skin, structure, actuators, and features of the animated figure. As such, dimensions, sizing, tolerances, and other specifications associated with the animated figure may be determined based on the mechanical digital asset to facilitate preparation of the animated figure. Preparation of the animated figure may also include determining positioning, placement, and/or designation of markers within and/or on the animated figure. The markers may include signal emitters, uniquely colored material (e.g., paint, dye, and stickers), selected features, surface textures, pins, retroreflectors, illuminated devices (e.g., visible or invisible infrared or ultraviolet light sources), or the like. Such markers may be detectable using a camera or other sensor and utilized for synchronization of the animated figure with the projector so that projections properly align with the surface of the animated figure, which operates as a projection surface. Completion of detailed mechanical design and completion of the AVLP design correspond to completion of the tangible design phase, as represented by block 166. At this point, the process 150 transitions to tangible fabrication, as represented by block 168.

Figure 8:
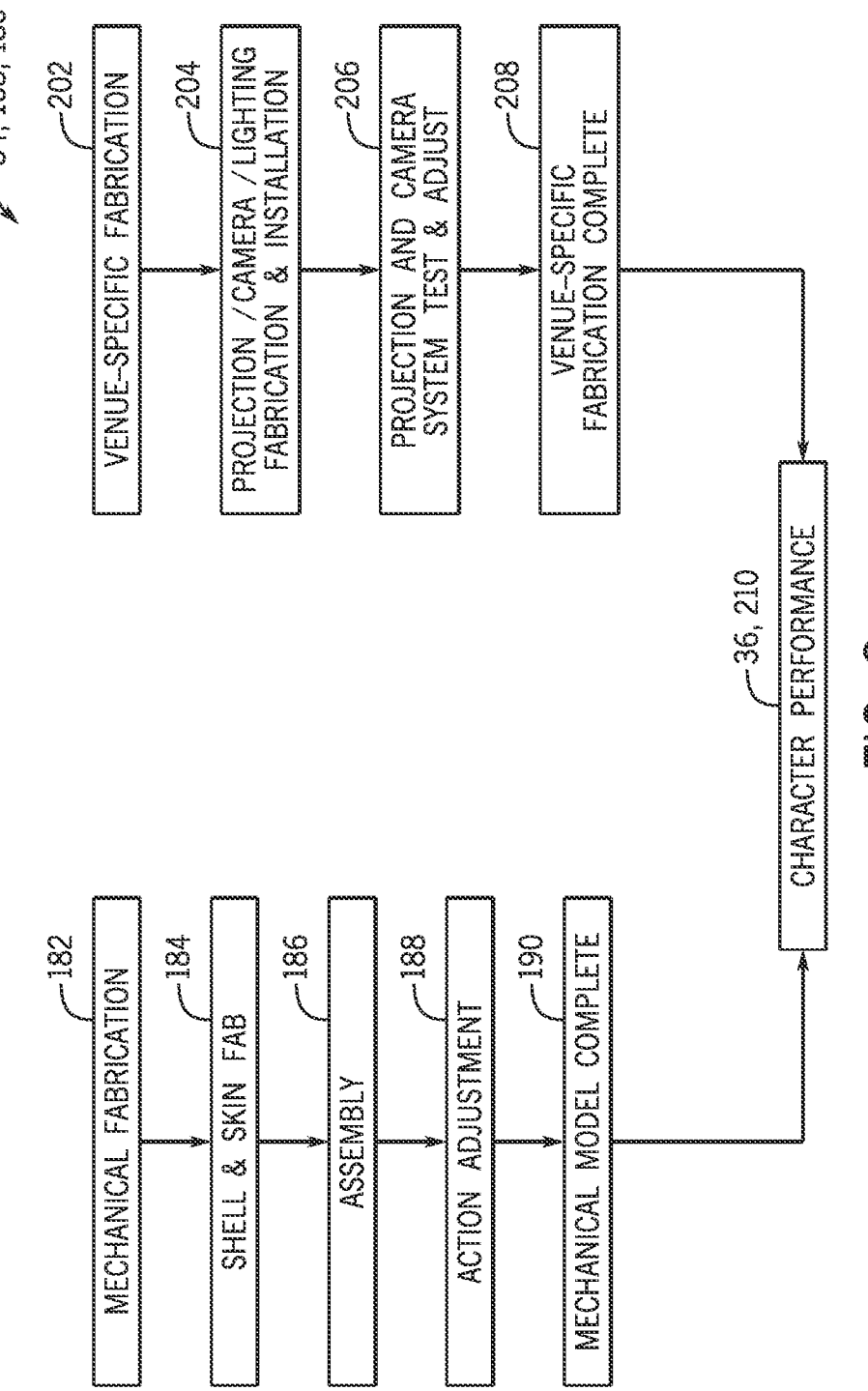
FIG. 8 is a process flow diagram that represents a process for performing a tangible fabrication/installation step of a process operation of FIG. 2, in accordance with an aspect of the present disclosure.

FIG. 8 is a process flow diagram that represents a process 180 for performing the tangible fabrication/installation step 34 of the process 12, in accordance with the present disclosure. As previously noted, procedures such as the process 180 include steps illustrated in a particular order. However, it should be understood that the order of operations may be modified, rearranged, truncated, or the like while keeping within the scope of the present disclosure. In the illustrated embodiment of the process 180, a converging parallel approach is depicted. A first branch of the process 180 commences with mechanical fabrication of the animated figure, as represented by block 182, which is performed using previously acquired dimensions and specifications from the mechanical digital asset. For example, block 182 may represent fabrication of a shell (e.g., a head) for the animated figure. Block 184 represents fabrication of the shell, skin, and any other suitable components (e.g., mechanics or actuators) that may be implemented on the shell. Block 186 represents assembling the fabricated skin, shell, and mechanics (e.g., actuators) with one another to form a portion of the tangible animated figure. Once the shell, skin, mechanics, and base are assembled (block 186), actuations may be tested, tuned, and adjusted, as represented by block 188, to achieve desired aesthetics and functionality of the assembled portion of the animated figure, such as based on simulated actuations via the computer-generated model. After the desired aesthetics and functionality of the assembled portion of the animated figure has been achieved, a finalized mechanical model of the animated figure (e.g., a complete mechanically actuated head, which may include a face configured to present various facial expressions) may be considered complete, as represented by block 190.

A second branch, which may proceed in parallel with the first branch, may begin with scene-specific fabrication and preparation, as represented by block 202. Scene-specific fabrication and preparation may include assembly of staging for the animated figure, associated props, and the like. Another step in this second branch includes projection, camera, and lighting fabrication and installation, as represented by block 204, such as positioning cameras, projectors, lighting systems, and the like to establish an appropriate look and feel for the scene. Once such features have been positioned, a step of testing and adjustment may occur, as represented by block 206. Specifically, block 206 may include adjusting positioning of camera for use in identifying markers positioned at the animated figure and synchronizing projections with movement of the animated figure along with adjustment and tuning of the projectors and projections. Once a desired level of tuning and adjustment is reached, the scene-specific fabrication may be considered complete, as represented by block 208. With both branches of the process 180 complete, the process may proceed to character performance, as represented in FIG. 8 by block 210.

Figure 9:
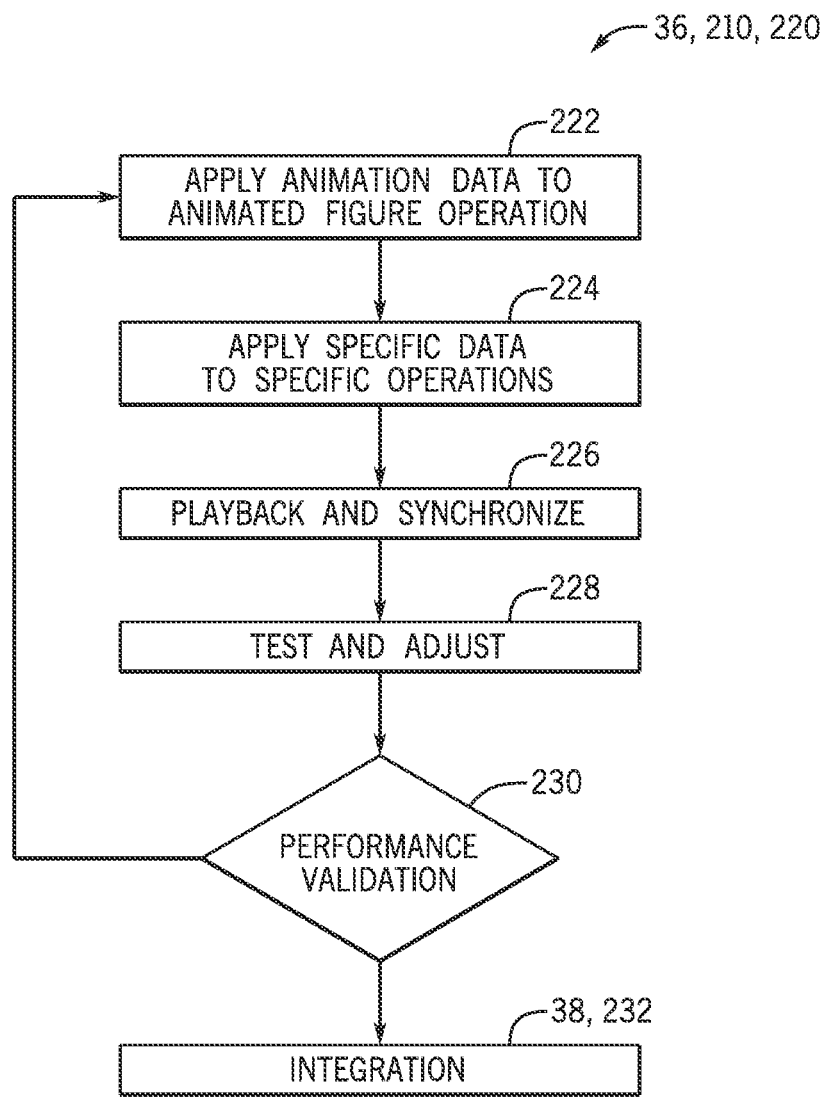
FIG. 9 is a process flow diagram that represents a process for carrying out a character performance step of a process operation of FIG. 2, in accordance with an aspect of the present disclosure.

FIG. 9 is a process flow diagram that represents a process 220 for carrying out the character performance step 36 of the process 12, in accordance with the present disclosure. This process 220 relates to operation of the animated figure (e.g., facial and/or figure animation) in conjunction with projection on the animated figure, in accordance with the present disclosure. Indeed, image data (e.g., image data used to project imagery onto the tangible model, adjusted image data based on projected imagery on the tangible model) may be transmitted to a projector to output imagery onto the animated figure. Such operation of the projector may be coordinated with movement of the animated figure. Audio associated with the character performance may also be employed during the process 220, wherein the audio may be synchronized with relevant aspects of the character performance. Among other things, external tracking (e.g., via optical performance capture or optical motion capture) of the animated figure is used by present techniques and embodiments to dynamically generate and project images onto an external surface of the animated figure, thereby reducing or eliminating any unnatural backlighting. In more detail, to enhance the authenticity of the animated figure, the animated figure may be fitted with trackers that enable tracking cameras of a media control system to discern movements, positions, and orientations of the animated figure in real-time via optical performance capture or optical motion capture. Thus, because the media control system may operate independently of the animated figure (e.g., by not relying on position, velocity, and/or acceleration information regarding actuators of the animated figure), the media control system may reduce latency of operation and dynamically generate, adjust, and/or project images onto the interactive animated figure at a realistic framerate that emulates live characters, such as by presenting textures, colors, and/or movements that appear to be indistinguishable (e.g., separately formed) from the animated figure.

As illustrated in FIG. 9, a step of the process 220 may include applying animation data (e.g., programmed movements, movements corresponding to motion capture data, movement simulated via a computer-generated model), such as animation data created at block 58 and iteratively modified based on operation of other processes, along with audio (when relevant) to animated functions (e.g., facial expressions or other figure movements) of the animated figure, as represented by block 222. The animation data may cause movement of the physical animated figure based on simulated actuation of the bone structure of the computer-generated model of the animated figure. As described above, the animation data may cause movement of the computer-generated model by operating simulated actuators of the computer-generated model. Additionally, the animated figure may include real-life actuators corresponding to the simulated actuators. The animation data may therefore be used to operate the real-life actuators and cause corresponding movement of the animated figure. In this manner, the computer-generated model may be controlled to provide corresponding control of the animated figure. Also, specific animation data, such as any additional animation data that may supplement the updated/modified animation data applied at block 222, may be applied to specific operations, as broadly represented by block 224. For example, where facial expression actuations are employed with an animated figure, a step of applying the animation data to facial actuators via direct algorithm may be employed to adjust movement of the animated figure.

Further, as represented by block 226, once animation of the animated figure has been established, the animation of the animated figure (e.g., an animated character head) may be played back and synchronized with projection (e.g., image data being transmitted to the projector), tracking operations (e.g., a camera system tracking markers on the animated figure), and AVLP operations to provide dynamic media. Testing and adjustment of the dynamic media (e.g., movement of the animated figure, image data used to project imagery) may then occur, as indicated by block 228, and iterations of all or selected aspects of the process 220 may continue until validation of the performance of the animated figure and/or the projected imagery is established, as represented by block 230. For example, a simulated projector may be controlled to project a simulated image onto the computer-generated model of the animated figure, and the appearance of the computer-generated model with the simulated image projected thereon may closely correspond to an appearance of the animated figure with a corresponding image projected thereon. Therefore, a real life or physical projector may be controlled to project the corresponding image onto the animated figure based on the simulated image projected onto the computer-generated model. With respect to FIG. 9 and other figures representing iterative procedures, it should be noted that while block 230 and other iteration indicators may point to a specific step in the illustrated embodiment, steps other than that indicated or even excluding the one indicated may be designated for iteration. Such illustrations are representative of both broad and specific iteration options.

As will be understood, with respect to completion of the process 220, the media control system of certain embodiments may generate and update a skeletal model of the animated figure based on feedback from the tracking cameras. The skeletal model generally represents the moveable portions of the animated figure, such as actuatable joints thereof, and is dynamically updated to represent a current position (e.g., including x, y, and z translational coordinates and/or x, y, z rotational coordinates), orientation, and/or scale of the animated figure or portions thereof (e.g., a pose of the animated figure). The media control system therefore utilizes the skeletal model to generate the images for projection that precisely suit the current position, orientation, and/or sizing of the animated figure. The dynamic media system therefore provides the motion control system having the animated figure that is responding to the interactive data, as well as the media control system that responds to the mechanical performance of the animated figure. These two control loops therefore provide improved system performance based on the optical motion capture of the animated figure to deliver an engaging character presentation to guests, regardless of the mechanical positioning of the animated figure. Next, the process 220 transitions to integration, as indicated by block 232.

Figure 10:
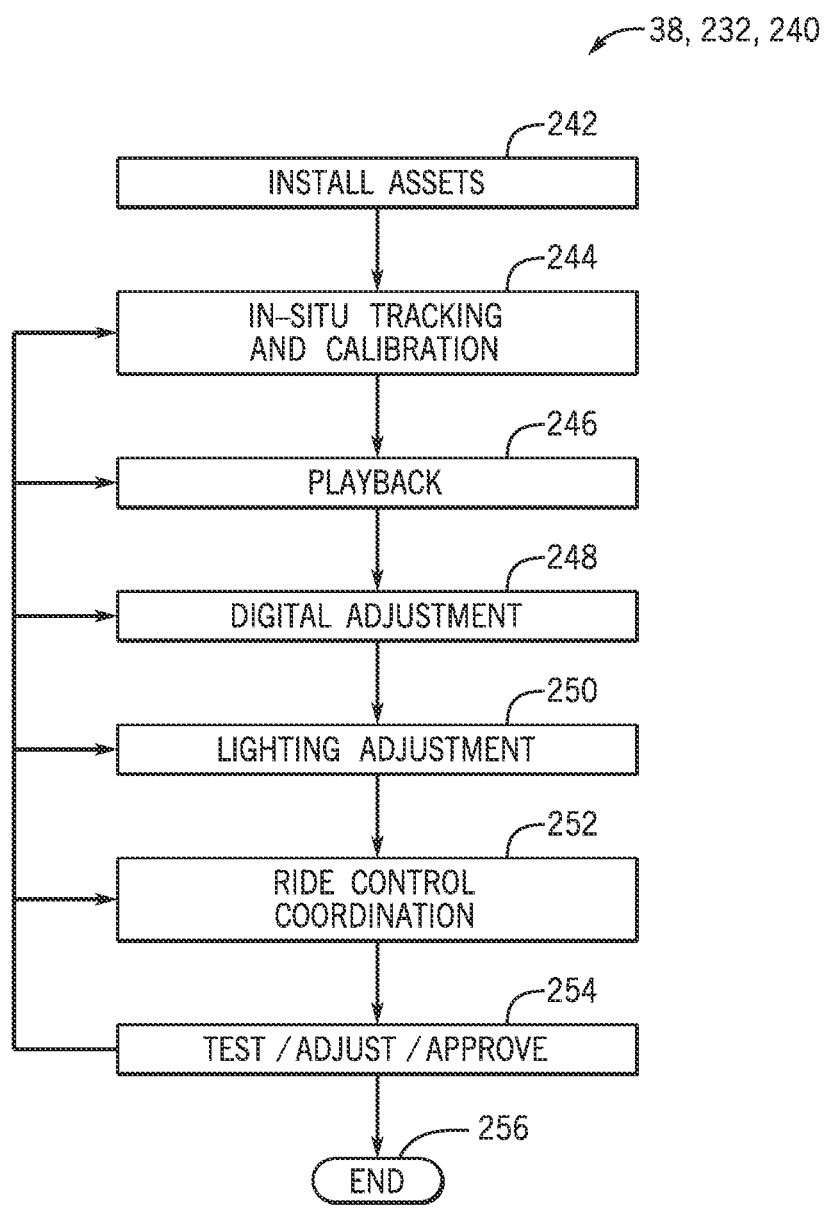
FIG. 10 is a process flow diagram that represents a process for carrying out an integration step of a process operation of FIG. 2, in accordance with an aspect of the present disclosure.

FIG. 10 is a process flow diagram that represents a process 240 for carrying out the integration step 38 of the process 12, in accordance with the present disclosure. As illustrated in FIG. 10, the process 240 may be initiated by installing tangible assets (e.g., an animated figure, lighting effects, camera systems, projectors, and supporting materials) in a scene area for an attraction system. This installation process is represented by block 242. Once this installation is completed, the process includes steps (as represented by blocks 244, 246, 248, 250, and 252), which may be iteratively performed by one or more controllers (e.g., automation controllers with one or more processors and memories, such as a programmable logic controller), in accordance with the present disclosure. Block 244 represents in-situ tracking and calibration of attraction effects (e.g., figure animation, projection, lighting, audio, and show control). For example, operation and/or positioning of various components, such as the animated figure (e.g., actuators), the projector, a light emitter, an audio emitter, and so forth, may be adjusted based on the installation of the tangible assets, such as to accommodate tolerances or offsets resulting from the installation. Block 246 represents playback of attraction effects, which may incorporate adjustments from calibration to determine a resulting appearance of the attraction effects. For example, a determination may be made regarding whether the appearance of the dynamic media is desirable from the guests' perspective.

Block 248 represents digital adjustments to imagery (e.g., image data) for display on the animated figure (e.g., computer-generated lighting and shading of animated facial projections) within the scene area. For example, the imagery may be adjusted based on the appearance of the imagery projected onto the animated figure. Block 250 represents lighting (e.g., theatrical lighting) adjustments within the scene area, such as to adjust visibility of various effects (e.g., portions of the animated figure) from the guests' perspective. The lighting may include real lighting, such as physical lighting that illuminates the scene area. The lighting may also include virtual lighting, which may include lighting that affects the imagery being projected (e.g., lighting produced by operating a projector or display providing the imagery). The lighting may be iteratively adjusted to enable the projected imagery to appear more realistically in the scene area, such as to appear as physical features instead of digital content. Block 252 represents synchronization and/or triggering of a ride and control system in coordination with the other attraction operations. Synchronization of the ride and control system may include controlling and calibrating positioning of a ride vehicle with specific movements and projections related to the animated figure. For example, it may be desirable to position the ride vehicle such that passengers have a clear and unobstructed view of the animated figure during particular phases of a presentation and/or such that the relative positioning between the passengers and the animated figure cause the passengers to focus their view on a specific portion (e.g., a front of the face) of the animated figure. Block 254 represents an iteration initiation based on testing, adjustment, and approval to determine whether operation and/or positioning of a certain component is to be adjusted to provide a desirable effect. If further adjustment is needed based on testing (e.g., with respect to a particular iterative action), such iterations may be repeated until approval is established and the process ends at block 256.

Technical effects of the disclosed dynamic media process include provision of a motion control system with an animated figure that employs one or more of a game engine, projection, motion capture, marker tracking, user input, artificial intelligence, modeling, actuator positioning, structural positioning, and various iterations to deliver an engaging and realistic experience to amusement attraction guests. In particular, the dynamic media process may include layering of various techniques to integrate subtle interactions that increase believability and immersion within a theme. Performance (e.g., iterative performance) of the techniques may provide a computer-generated model corresponding to a real-life model. The computer-generated model may be controlled to more closely and precisely simulate control of the real-life model. For example, simulation of movement of the computer-generated model and projection of imagery onto the computer-generated model may provide a realistic appearance of corresponding movement of the real-life model and/or corresponding projection of imagery onto the real-life model. Such operation may provide a more desirable show effect to guests. As an example, by manipulating an articulating jaw or other moveable portions of a physical animated figure in conjunction with projection media that has been precisely coordinated with such movements via iterative simulation, fabrication, and synchronization, present embodiments provide realistic and engaging effects. Moreover, the dynamic media process includes real-time tracking of markers and coordination with projection on an outside surface of the animated figure. Therefore, a presently disclosed process can provide realistic projection/movement interactions based on a process that transitions between simulation and physical operations to provide a strong alignment between different media types to mimic reality.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park attraction system, comprising:
a projector configured to output imagery; and
a control system comprising:
at least one processor; and
a memory configured to store instructions configured to cause the control system to perform operations, the operations comprising:
defining a first computer-generated model corresponding to an animated figure;
simulating projection of the imagery onto the first computer-generated model to establish first simulated projection data;
transmitting instructions to generate a first tangible model based on the first computer-generated model and the first simulated projection data;
generating an electronic scan of the first tangible model;
updating the first computer-generated model to obtain a second computer-generated model based on the electronic scan of the first tangible model;
simulating projection of the imagery onto the second computer-generated model to establish second simulated projection data;
transmitting instructions to generate a second tangible model based on the second computer-generated model and the second simulated projection data, wherein the first tangible model and the second tangible model are distinct tangible models; and
operating the projector to output the imagery onto the second tangible model.

2. The amusement park attraction system of claim 1, wherein the second computer-generated model comprises a plurality of simulated actuators, and the second tangible model is configured to receive a plurality of physical actuators corresponding to the plurality of simulated actuators.

3. The amusement park attraction system of claim 2, wherein the control system is configured to perform operations comprising:
receiving animation data;
actuating a simulated actuator of the plurality of simulated actuators of the second computer-generated model based on the animation data; and
actuating a physical actuator of the plurality of physical actuators based on the animation data and based on the physical actuator corresponding to the simulated actuator.

4. The amusement park attraction system of claim 3, wherein the control system is configured to perform operations comprising:
receiving motion capture data; and
generating the animation data based on the motion capture data.

5. The amusement park attraction system of claim 1, comprising a guest area and a scene area, wherein the second tangible model is disposed in the scene area, and the control system is configured to perform operations comprising:
determining a relative positioning between the guest area and the scene area; and
operating the projector to output the imagery onto the second tangible model based on the relative positioning.

6. The amusement park attraction system of claim 5, wherein the guest area comprises a ride vehicle configured to move relative to the scene area, and the control system is configured to operate the ride vehicle to move relative to the scene area.

7. The amusement park attraction system of claim 1, comprising lighting, wherein the control system is configured to perform operations comprising:
   monitoring a positioning of the first tangible model; and
   adjusting the lighting based on the positioning of the first tangible model.

8. The amusement park attraction system of claim 1, wherein the first tangible model is a miniaturized model of the second tangible model.

* * * * *